United States Patent [19]
Dunn et al.

[11] 3,772,935
[45] Nov. 20, 1973

[54] COMPOSITE HEAVY-DUTY SINTERED POWDERED MACHINE ELEMENT

[76] Inventors: William M. Dunn, 28639 Oak Point Dr., Farmington, Mich. 48024; Myron C. Sarnes, 20248 Woodhill, Northville, Mich. 48167

[22] Filed: Mar. 20, 1972

[21] Appl. No.: 235,940

[52] U.S. Cl. ................................................. 74/434
[51] Int. Cl. ............................................ F16h 55/00
[58] Field of Search ...................... 74/434, 417, 423; 29/159.1, 182, 182.3

[56] References Cited
UNITED STATES PATENTS

| | | | |
|---|---|---|---|
| 3,666,456 | 5/1972 | Haller | 75/208 |
| 2,331,909 | 10/1943 | Hensel et al. | 29/159.2 |
| 2,561,579 | 7/1951 | Lenel | 74/434 |
| 2,704,465 | 3/1955 | Haller | 74/434 |
| 3,678,557 | 7/1972 | Howard | 29/159.2 |

*Primary Examiner*—Leonard H. Gerin
*Attorney*—Willis Bugbee

[57] ABSTRACT

A composite heavy-duty machine element such as a face gear (FIG. 7), a spur or helical gear (FIG. 14), or ball bearing races (FIG. 18), has its working or load bearing portion composed of sintered powdered high-performance alloy while its supporting portion not subjected to concentrated or intense heavy loads is made of a base metal such as sintered powdered iron. In FIGS. 1 through 18 the powders of the two portions are inserted separately and successively in the die cavity of a briquetting press and simultaneously compacted to form a composite briquette which is then sintered to bond the separate portions together even though they are of different materials with different physical characteristics. The resulting composite sintered powdered metal machine elements is of lower material cost than such an element formed of high-performance alloy in its entirety, and may then be used as it is if of satisfactory density for its intended use, or it may be further densified by means of an additional compressing operation with the article cold, warm or by a hot forging operation, or with subsequent sintering if deemed necessary depending upon its intended use. If the machine element is to be a face gear, the face gear as briquetted and sintered is subjected to a further deforming operation to so incline its teeth.

6 Claims, 18 Drawing Figures

PATENTED NOV 20 1973

PATENTED NOV 20 1973 3,772,935
SHEET 2 OF 3

COMPOSITE HEAVY-DUTY SINTERED POWDERED MACHINE ELEMENT

This is a division of our co-pending application, Ser. No. 95,310, filed Dec. 4, 1970, for Composite Heavy-Duty Machine Element and Method of Making the Same, now U. S. Pat. No. 3,665,585, issued May 30, 1972.

BACKGROUND AND SUMMARY OF THE INVENTION

Heavy-duty machine elements which are subjected to high loads or stresses have hitherto been formed as forgings from high-cost nickel-content alloys which in themselves are very expensive and which consequently cause such machine elements made therefrom to be likewise very expensive. Nevertheless, in such machine elements only a portion thereof is ordinarily subjected to concentrated heavy loads, torques or stresses which require the use of high performance alloys, yet the formation of the entire machine element from such high performance alloys has hitherto been necessitated, requiring high cost forging operations in its production.

The present invention overcomes these prior disadvantages by providing heavy-duty machine elements wherein the working portions subjected to heavy or concentrated loads, torques or other stresses are formed from sintered powdered high-performance alloys whereas the remaining portions not so loaded are formed from sintered powdered low-performance metals. The two portions are bonded to one another inseparably as a result of their being sintered together. As a result, the quantity of high-cost, high-performance alloy in each machine element is greatly reduced in comparison with the same machine element forged from solid high-performance alloy throughout, with a corresponding reduction in the ultimate cost of the finished machine element as well as a conservation of nickel and other expensive metals. At the same time, the heavy-duty performance capability of the composite machine element is preserved without entailing the high cost previously accompanying the production of forged unitary high-performance machine elements. Moreover, test specimens made according to this invention and subjected to tensile strength tests in tension testing machines show that rupture of such specimens occurs at locations spaced away from the junctions between the two metals and not at such junctions.

Figure 10:
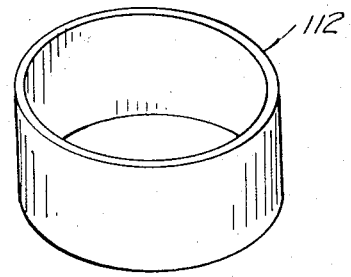
FIG. 10 is a perspective view of the divider or partition shown in FIG. 9.
Figure 11:
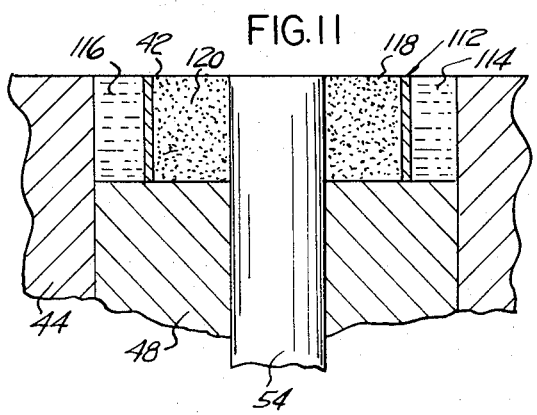
FIG. 11 is a view similar to FIG. 9 but showing the central portion of the die cavity filled with low-performance powdered base metal.
Figure 13:
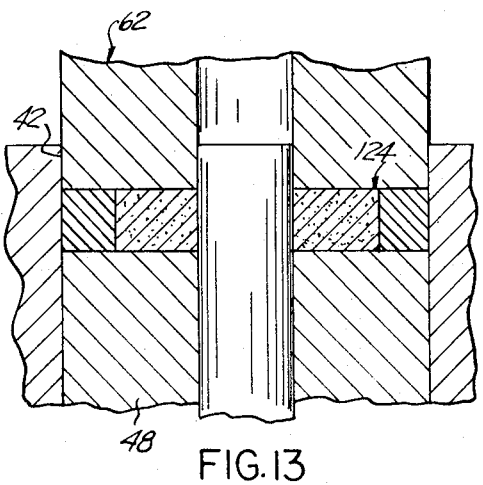
FIG. 13 is a view similar to FIGS. 9, 10 and 12 but with the upper punch lowered to compact the composite powdered metal charge into a composite briquette.
Figure 17:
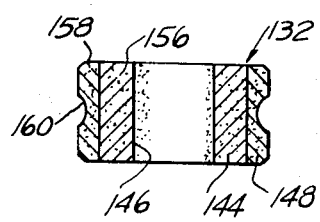
Figure 16:
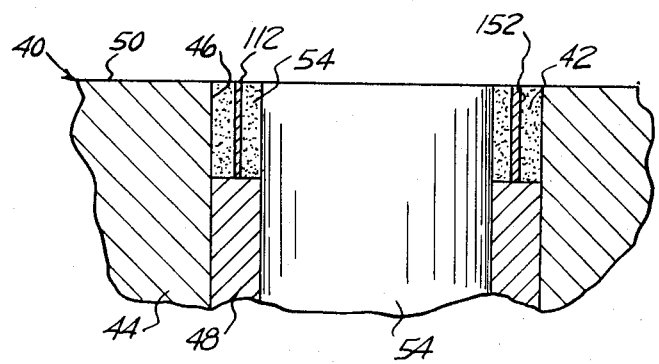
Figure 18:
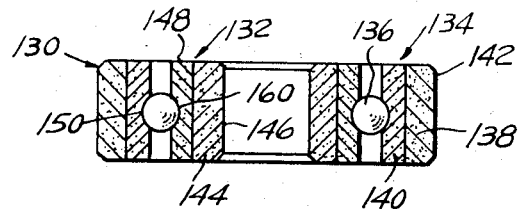

FIG. 16 is a central vertical section through the die cavity of a briquetting press showing the inner portion of the die cavity filled with high performance alloy powder and the outer portion thereof filled with low performance base metal powder, the two portions being separated from one another by an annular partition or divider similar to that shown in FIGS. 10 and 11, prior to the removal of the partition before compacting the composite powdered metal charge into a composite briquette suitable, after sintering, for the outer race of a ball bearing assembly;

FIG. 17 is a central vertical section through the composite inner race of a ball bearing assembly formed similarly to the outer race shown in FIG. 16, but with the positions of the alloy powder and base powder reversed so as to place the high performance alloy portion on the outer side of the race, the ball grooves being formed by cutting and/or grinding in a subsequent operation; and FIG. 18 is a central vertical section through a ball bearing assembly employing the composite outer and inner sintered powdered metal races of FIGS. 16 and 17.

Referring to the drawings in detail, FIGS. 1 to 8 inclusive show the preparation, according to this invention, of a composite heavy-duty bevel face gear, generally designated 30 (FIGS. 7 and 8) as consisting of an annular hub or core portion 32 of low performance sintered powdered material, such as sintered powdered iron, to the face of which is bonded, by sintering, an annular toothed peripheral portion 34 of high performance sintered powdered alloy metal described below, the teeth 36 being inclined outward relatively to the axis of the gear 30. The hub or core portion 32 forms the supporting portion of the gear 30 by which the latter is mounted upon its driving or driven element, and is not subjected to the concentrated stresses and loads as is the peripheral toothed portion 34. The teeth 36 are separated from one another by their respective tooth spaces or grooves 38.

Figure 7:
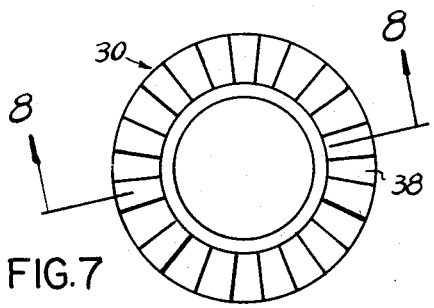
FIG. 7 is a top plan view of the face gear obtained as a result of the operations shown in FIGS. 1 to 6 inclusive.
Figure 8:
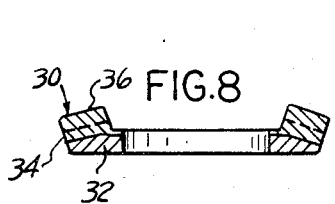
FIG. 8 is a central vertical section taken along the line 8—8 in FIG. 7.
Figure 9:
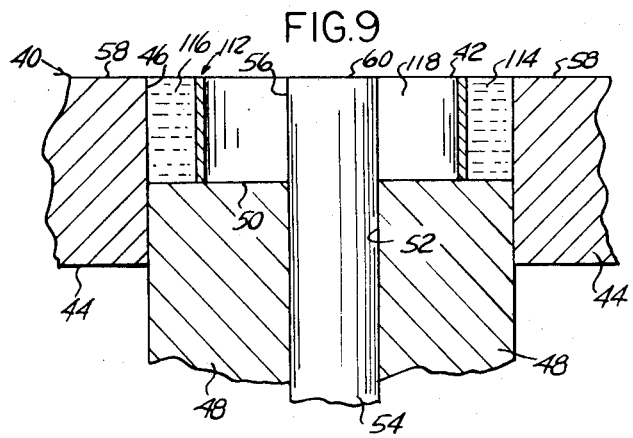
FIG. 9 is a central vertical section through the die cavity of a briquetting press showing the initial filling of the peripheral portion of the die cavity with high-performance metal powder outward of an annular divider or partition during formation of a spur gear briquette.

In the production of the bevel ring gear or face gear 30 of FIGS. 7 and 8, there is employed a conventional briquetting press, generally designated 40, of which only the working parts adjacent the die cavity 42 are shown. These parts are the die 44 with its die bore 46 forming the outer boundary of the die cavity 42, the tubular lower punch 48 being adjustably movable upward or downward within the die bore 46 and having an annular top or upper surface 50 and a central bore 52. Mounted within the bore 52 of the tubular lower punch 48 is a core rod 54 having an external cylindrical surface 56 forming the inner boundary of the die cavity 42. The die 44 and core rod 54 ordinarily have substantially flat upper surfaces 58 and 60 respectively. Movable upward and downward within the die cavity 42 is a tubular upper punch 62 having cylindrical outer and inner surfaces 64 and 66 respectively and a lower end 68 provided with alternating radial teeth 67 and grooves 69 shaped to form in the compact or briquette the tooth profile and intertooth spaces desired, the surfaces 64 and 66 snugly but slidably engaging the die and core rod surfaces 46 and 56 respectively while the toothed lower end 68 performs the pressing operation with the top surface 50 of the lower punch 48 serving as a temporarily stationary abutment. The upper punch 62 is customarily connected to and movable by a press platen which in turn is moved upward or downward by a hydraulic piston or mechanically by a connecting rod actuated by a crank on a crankshaft which is rotated by an electric motor (these conventional press parts not shown).

Prior to performing the first step in the process of the present invention, let it be assumed that the top surfaces 58 and 60 of the die 44 and core rod 54 are in the same plane and that the lower punch 48 has been moved downward until its top surface 50 is located at the desired depth for the die cavity 42. The operator then operates the press 40, filling the conventional filling shoe thereof (not shown) with low-performance metal powder such as powdered iron or low-carbon steel. He then moves the filling shoe across the top surfaces 58 and 60 of the die 44 and core rod 54 over the top of the die cavity 42, consequently filling the die cavity 42 with an initial charge 70 of low performance metal powder whereupon the filling shoe is then retracted.

Having performed the initial fill of the die cavity 42 with the initial low-performance powdered alloy charge 70, the operator now actuates the mechanism of the press 40 to lower the upper surface 50 of the lower punch 48 to a new and lower level (FIG. 2), likewise causing the low-performance powdered metal charge 70 to descend correspondingly in the die cavity 42. The operator then fills the filling shoe with a final charge 72 of high performance alloy powder capable of sustaining abnormally high or concentrated stresses or loads, and causes the shoe to move across the top surfaces 58 and 60 of the die 44 and core rod 54 over the top of the die cavity 42, consequently filling the die cavity 42 with a final charge 72 of high performance alloy powder, whereupon the filling shoe is again retracted.

Such a high-performance alloy may consist, for example, of the so-called "S.A.E. 4600" modified alloy, the standard composition of which is ordinarily as follows:

0 to 0.25% Mn.)
)
1.75 to 2.00% Ni.)    the remainder being Fe.
)
0.35 to 0.60% Mo.)

The standard "S.A.E. 4600" alloy of which the above is a modification has the following composition:

0.45 to 0.65% Mn.)
)
1.65 to 2.00% Ni.)
)    the remainder being Fe.
0.20 to 0.30% Mo.)
)
0.20 to 0.35% Si.)

The silicon component is omitted in the modified alloy because silicon is detrimental to the working life of a die set. It is ordinarily inserted in the above standard alloy in order to increase the fluidity of the molten alloy during the casting of intricate shapes.

The operator now sets in motion the press platen operating mechanism to cause the platen (not shown) and the tubular upper punch 62 thereon to move downward into the die cavity 42 (FIG. 3), compressing therein the composite powdered metal charge 74 into a composite briquette or compact 76 with radial teeth 77 and tooth spaces 78 on its upper side and with a bore 79 formed by the core rod 54. A pressure of 25 to 35 tons per square inch is employed, depending upon the density desired for the composite briquette 76. The composite compact or briquette 76 is then ejected from the die cavity 42 by moving the lower punch 48 upward and is sintered in a non-oxydizing or reducing atmosphere, such as hydrogen, in a conventional sintering oven at the usual times and temperatures familiar to those skilled in the powder metallurgy art. The sintered composite powdered metal blank 80 (FIG. 4) with its face teeth 67 and tooth spaces 69 thus produced is removed from the furnace with its low performance component 82 firmly and inseparably bonded to its high performance component 84.

To form the bevel ring gear 30 from the composite sintered powdered metal blank 80, the latter is placed in the die cavity 86 (FIG. 5) of the die 88 of a forming die set 90 having a tubular punch 92 with multiple circumferentially-spaced radial tooth-profile-forming projections 94 and tooth spaces 95 arranged at obtuse angles to one another around the lower end 96 thereof and shaped to substantially the same tooth profiles and tooth spaces as the teeth 77 and tooth spaces 78, so as to mate with the teeth and tooth spaces on the blank 80. The die 88 has a central bore 98 therein.

The operator now operates the forming press mechanism to cause the forming die punch 92 to move downward into the die cavity 86 (FIG. 6), whereupon the tooth-forming projections 94 deform the toothed upper face of the upper high performance portion 84 of the composite blank 80 into the multiple teeth 36 and their respective intervening tooth spaces or grooves 38 while at the same time bending and thus deforming the rim of the blank 80 outward into the die cavity 86 to produce the bevel face gear 30 with its outwardly-inclined teeth 36 (FIGS. 7 and 8).

Figure 1:
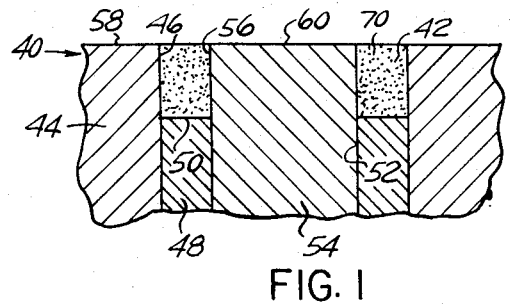
FIG. 1 is a central vertical section through the die cavity of a briquetting press showing the filling thereof with low-cost base metal powder for the production of a face gear.
Figure 2:
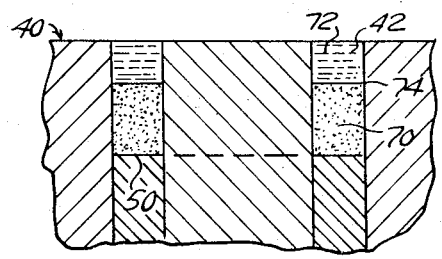
FIG. 2 is a view similar to FIG. 1 but with the lower punch moved downward and the resulting space filled with high-performance alloy powder.
Figure 3:
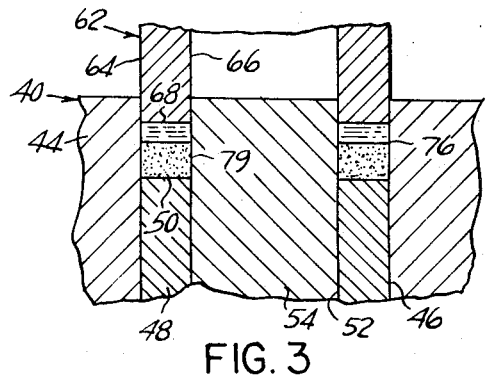
FIG. 3 is a view similar to FIGS. 1 and 2 but showing the composite powdered metal charge in the die cavity being compacted into a briquette.
Figure 4:
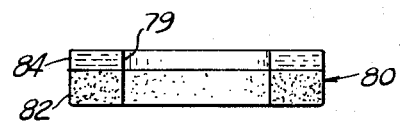
FIG. 4 is a central vertical section through the composite powdered metal blank obtained after sintering the briquette shown in FIG. 3.
Figure 6:
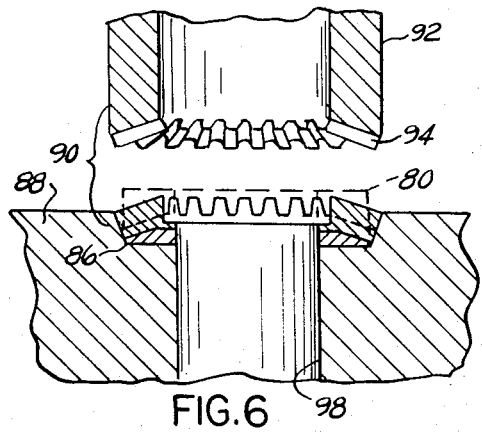
FIG. 6 is a view similar to FIG. 5 but with the tooth-forming upper punch raised and with the original shape of the blank shown in dotted lines.
Figure 5:
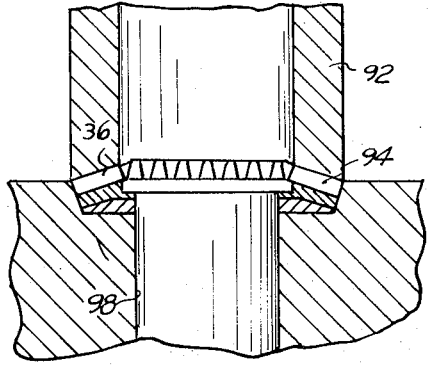
FIG. 5 is a central vertical section, partly in side elevation, through a deforming die set showing the sintered composite powdered metal blank of FIG. 4 at the end of its deformation into a face gear, with the tooth-forming upper punch lowered.

The composite heavy-duty spur gear 100 (FIGS. 14 and 15) is formed in the manner shown in FIGS. 9 to 13 inclusive likewise employing a briquetting press 40 similar to that shown in use in FIGS. 1, 2 and 3, hence similar parts are designated with the same reference numerals. The spur gear 100 consists of an annular hub or core portion 102 of lowperformance sintered powdered material, such as sintered powdered iron, to the periphery of which is bonded, by sintering, an annular toothed peripheral portion 104 of high-performance sintered powdered alloy metal such as that previously described above for the peripheral portion 34 of the bevel ring gear 30 of FIGS. 7 and 8. The hub or core portions, as before, forms the supporting portion of the gear 100 by which the latter is mounted upon its driving or driven element, such as a shaft (not shown) and is, as before, not subjected to the concentrated stresses and loads as is the peripheral toothed portion 104. The teeth 106 in the peripheral portion 104 are directed radially outward and are separated from one another by their respective tooth spaces or grooves 108. The hub or core portion 102 contains an axial shaft bore 110 formed by the core rod 54. To form the teeth 106 and tooth spaces 108 of the spur gear 100, the die cavity 42 of the die 44 is provided with correspondingly shaped radial recesses 109 and ridges 111, with which mate correspondingly-shaped radial teeth 113 and tooth spaces 115 on the lower end of the upper punch 62.

Figure 15:
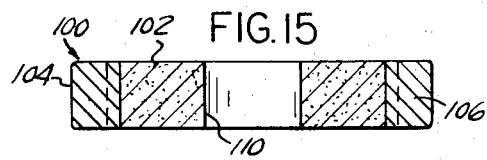
FIG. 15 is a central vertical section through the composite spur gear of FIG. 14 taken along the broken line 15—15 therein.
Figure 14:
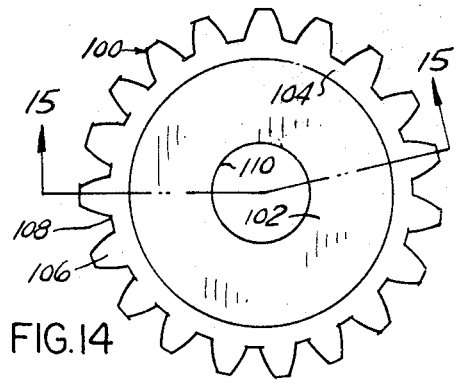
FIG. 14 is a top plan view of the composite heavy duty spur gear formed from the briquette shown in FIG. 13, after being sintered into a blank.

In the production of the spur gear 100 of FIGS. 14 and 15, the briquetting press 40 is operated in a manner similar to that described above by lowering the lower punch 48 so that its upper surface 50 is disposed at the desired depth to form the desired depth of die cavity 42. The top surface 60 of the core rod 54 is positioned in the same plane as the top surface 58 of the die 44. A tubular divider or partition 112 (FIG. 10) of the same height as the depth of the die cavity 42 is now placed in the die cavity 42 resting upon the top surface 50 and carefully centered with respect to the axis of the die bore 46 and core rod 60. The operator then fills the outer annular cavity portion or subdivision 114 of the die cavity 42 with high performance alloy powder similar to that described above until the top surface of the thus-formed high performance alloy powder charge 116 is level with the top surfaces 58 and 60 of the die 44 and core rod 54 respectively. The parts now occupy the relative positions and appearance shown in FIG. 9.

The operator now fills the inner portion or subdivision 118 of the die cavity 42 with low performance core or hub material powder to form the inner or central charge 120, a suitable material being powdered iron which term, as used throughout the present specification, includes powdered low-carbon steel. Filling, as before, is carried out up to the level of the top surfaces 58 and 60 of the die 44 and core rod 54. The parts now occupy the position shown in FIG. 11.

Figure 12:
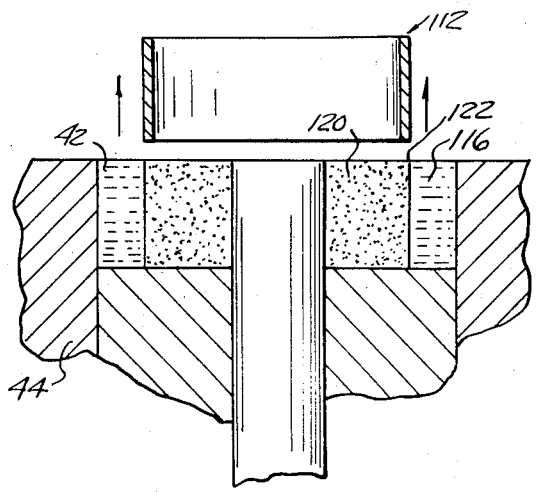
FIG. 12 is a view similar to FIG. 11 but showing the removal of the divider or partition.

The operator now removes the divider or partition 112 by carefully grasping it and pulling it upward as shown in FIG. 12, thereby causing the inner and outer powder charges 120 and 116 to settle down into contact with one another.

The operator now starts the press platen operating mechanism to cause the platen (not shown) and the tubular externally-toothed upper punch 62 thereon to move downward into and mate with the internally-toothed die cavity 42 (FIG. 13) thereby compressing the composite powdered metal charge 122 into a radially toothed composite briquette or compact 124 as before, a pressure of 25 to 35 tons per square inch is employed, depending upon the density desired for the composite briquette or compact 124.

The operator now causes the upper punch 62 to be retracted upward by actuating the press mechanism to retract the press platen, after which he causes the lower punch 48 to move upward and eject the composite radially-toothed briquette or compact 124 from the die cavity 42. The compact or briquette 76 is then sintered in a non-oxidizing or reducing atomsphere, such as hydrogen, in a conventional sintering oven at the usual times and temperatures familiar to those skilled in the powder metallurgy art.

If greater precision is required for the profiles of the teeth 106 of the spur gear 100 from the composite sintered powdered metal toothed spur gear thus produced, the latter is placed in a conventional gear grinding or cutting machine, which makes a finish grind or cut thereon. The spur gear 100 thus formed now has its toothed rim portion 104 of high performance sintered powdered alloy firmly bonded to the inner or hub portion 102 of low performance sintered powdered metal and is then ready for use.

The ball bearing assembly, generally designated 130, shown in cross-section in FIG. 18 is also made by employing similar principles utilized in the making of the spur gear 100 in FIGS. 9 to 14 inclusive, hence a brief description is believed to suffice. The ball bearing assembly 130 consists of an externally-grooved composite outer race 134 also of sintered powdered metal, and a set of bearing balls 136 disposed between the races 130 and 132 and running in the grooves therebetween. In particular, the outer race 134 consists of an outer annular mounting portion 138 of low performance sintered powdered metal such as sintered powdered iron which is bonded, by sintering, to an inner annular portion 140 of high-performance sintered powdered alloy similar to that described above since it is this inner portion 140 that is subjected to much heavier loads and concentrated stresses than the outer portion 138. The outer portion 138 of the outer race 134 has an external cylindrical surface 142 by which it is mounted in a counterbore of a housing (not shown) or similar structure relatively to which the machine element mounted in the inner race 132 is caused to rotate.

The inner race 132, on the other hand, has its inner annular mounting portion 144 composed of low performance sintered powdered metal, such as sintered powdered iron, with a mounting bore 146 therethrough for receiving the shaft or other machine element journaled in the bearing 130. The inner race 132 (FIG. 17) has an outer load bearing portion 148 of high-performance sintered powdered alloy such as that described above for the reason that it, too, is subjected to heavy or concentrated loads and stress which are much greater than those required to be sustained by the inner portion 144.

The outer race 134 is made in the manner shown in FIG. 16, which in turn follows the procedure set forth above in connection with FIGS. 9 to 13 inclusive, hence the same reference numerals are employed. As before, a tubular divider or partition 112 like that of FIG. 10 is inserted in the die cavity 42 of the briquetting press 40 and carefully centered therein with reference to the axis of the core rod 54 and die bore 46. The filling of the outer and inner portions of the die cavity 42 is, however, reversed in FIG. 16 in that portions of the die cavity outside the divider 112 are filled with low performance alloy powder such as the powdered iron described above, and the portions inside the divider 112 filled with high performance metal powder such as the alloy powder also described above, thereby producing the outer and inner charges 152 and 154 respectively. The divider 112 is then removed in the manner described above, and the upper punch 62 (FIG. 13) is lowered to compress the charges 152 and 154 simultaneously into a composite briquette or compact (not shown) which is then sintered in a manner described in connection with the briquette or compact 124 of FIG. 13. Instead of forming teeth on the composite sintered powdered metal blank thus made, however, an internal annular ball groove 150 of arcuate cross-section is machined therein.

The composite inner race 132, however, is formed more nearly in the manner set forth above in connection with FIGS. 9 to 13 inclusive in that the inner or mounting portion 156 thereof with the mounting bore 146 therein is of low performance sintered powdered metal such as powdered iron whereas the outer portion 158 is of the above-mentioned high-performance sintered powdered alloy arranged in the same relationship within the die cavity 42 as in FIGS. 9 to 13 inclusive and employing the same procedures with regard to briquetting and sintering. In the inner race 132, however, an annular ball groove 160 of arcuate cross-section is additionally machined in the high-performance outer portion 158 disposed opposite to and facing the ball groove 150 (FIG. 18). A set of bearing balls 136 is then inserted into the ball grooves 150 and 160 between the outer and inner races 134 and 132 and the bearing is ready for use.

We claim:

1. A composite heavy-duty machine element comprising
    an annular mounting member of inexpensive low-performance sintered powdered ferrous metal particles,
    and an annular working member of high-performance sintered powdered manganese-molybdenum alloy particles disposed in coaxial surface-to-surface engagement therewith and hot-forgedly secured thereto in interlocking-particle relationship at the junction therebetween.

2. A composite heavy-duty machine element, according to claim 1, wherein said junction is substantially cylindrical.

3. A composite heavy-duty machine element, according to claim 1, wherein said junction is substantially frustoconical.

4. A composite heavy-duty machine element, according to claim 1, wherein said working member is disposed externally of said mounting member.

5. A composite heavy-duty machine element, according to claim 1, wherein said working member is disposed face-to-face with said mounting member.

6. A composite heavy-duty machine element, according to claim 1, wherein said working member is disposed internally of said mounting member.

* * * * *